US010144137B2

(12) United States Patent
Kim et al.

(10) Patent No.: US 10,144,137 B2
(45) Date of Patent: Dec. 4, 2018

(54) APPARATUS FOR CONVERTING A PLURALITY OF LINEAR MOVEMENT INTO TWO DEGREE OF FREEDOM MOVEMENT

(71) Applicant: KOREA INSTITUTE OF SCIENCE AND TECHNOLOGY, Seoul (KR)

(72) Inventors: Keehoon Kim, Seoul (KR); Donghyun Hwang, Seoul (KR); Sang Rok Oh, Gangneung-si (KR)

(73) Assignee: Korea Institute of Science and Technology, Seoul (KR)

( * ) Notice: Subject to any disclaimer, the term of this patent is extended or adjusted under 35 U.S.C. 154(b) by 394 days.

(21) Appl. No.: 14/938,324

(22) Filed: Nov. 11, 2015

(65) Prior Publication Data

US 2017/0095935 A1    Apr. 6, 2017

(30) Foreign Application Priority Data

Oct. 1, 2015  (KR) .................. 10-2015-0138481

(51) Int. Cl.
  *B25J 17/00*  (2006.01)
  *B25J 17/02*  (2006.01)
  *F16H 1/32*  (2006.01)

(52) U.S. Cl.
  CPC ............ *B25J 17/0266* (2013.01); *F16H 1/32* (2013.01)

(58) Field of Classification Search
  CPC ........ B25J 17/0266; F16H 1/32; F16H 25/14; F16H 21/50
  USPC ... 74/20–110, 124, 438, 498, 820, 832, 835; 475/162–181
  See application file for complete search history.

(56) References Cited

U.S. PATENT DOCUMENTS

| | | | | |
|---|---|---|---|---|
| 3,200,668 | A | * 8/1965 | Janes | ................... F16H 49/001 310/83 |
| 3,320,828 | A | * 5/1967 | Grant | ....................... F16H 1/32 475/1 |
| 3,589,243 | A | * 6/1971 | Bowman | .............. F03C 1/0531 91/180 |
| 5,145,467 | A | 9/1992 | Periou et al. | |
| 6,155,220 | A | * 12/2000 | Marriott | .................... F01L 1/34 123/90.17 |
| 6,890,281 | B2 | 5/2005 | Song | |
| 7,086,309 | B2 | * 8/2006 | Stoianovici | .............. F03C 1/04 74/640 |

(Continued)

FOREIGN PATENT DOCUMENTS

| | | |
|---|---|---|
| KR | 10-0307944 B1 | 12/2001 |
| KR | 10-2015-0040655 A | 4/2015 |
| WO | WO 2005/119093 A1 | 12/2005 |

*Primary Examiner* — Victor L MacArthur
(74) *Attorney, Agent, or Firm* — NSIP Law

(57) ABSTRACT

A movement conversion apparatus has a frame, a plurality of auxiliary moving bodies connected to the frame to allow linear movement, a plurality of actuators configured to move the plurality of auxiliary moving bodies with respect to the frame, a main moving body surrounded by the plurality of auxiliary moving bodies and connected to the plurality of auxiliary moving bodies to have a hollow formed therein, and a rotating body rotatable on the basis of a rotary shaft fixed through the hollow. The plurality of auxiliary moving bodies are selectively moved to adjust a location of the main moving body. The rotating body is inserted into the hollow to rotate by a movement of the main moving body.

15 Claims, 8 Drawing Sheets

(56) References Cited

U.S. PATENT DOCUMENTS

| | | | | |
|---|---|---|---|---|
| 7,247,116 B2* | 7/2007 | Stoianovici | ............... | F03C 1/04 |
| | | | | 475/162 |
| 7,703,281 B2* | 4/2010 | Kosaka | ................. | G02B 7/102 |
| | | | | 310/306 |
| 7,948,337 B2* | 5/2011 | Chu | ..................... | G11B 9/1481 |
| | | | | 335/78 |
| 8,061,262 B2* | 11/2011 | Stoianovici | ............... | F01C 1/10 |
| | | | | 91/491 |
| 8,350,959 B2* | 1/2013 | Topliss | .................... | F03G 7/065 |
| | | | | 348/208.11 |
| 8,926,465 B2* | 1/2015 | Stotz | ........................ | F16H 1/32 |
| | | | | 475/162 |
| 2006/0266031 A1* | 11/2006 | Kosaka | ................. | G02B 7/102 |
| | | | | 60/527 |
| 2015/0100159 A1 | 4/2015 | Park et al. | | |
| 2015/0130333 A1 | 5/2015 | Tbatou | | |
| 2016/0076623 A1* | 3/2016 | Nakamura | .............. | F16H 55/16 |
| | | | | 475/180 |
| 2017/0095935 A1* | 4/2017 | Kim | .................... | B25J 17/0266 |

\* cited by examiner

APPARATUS FOR CONVERTING A PLURALITY OF LINEAR MOVEMENT INTO TWO DEGREE OF FREEDOM MOVEMENT

CROSS-REFERENCE TO RELATED APPLICATION

This application claims priority to Korean Patent Application No. 10-2015-0138481, filed on Oct. 1, 2015, and all the benefits accruing therefrom under 35 U.S.C. § 119, the contents of which in its entirety are herein incorporated by reference.

BACKGROUND

1. Field

The present disclosure relates to an apparatus for converting a plurality of linear movements into a 2 degree-of-freedom (2-DOF) movement, and more particularly, to an apparatus for converting linear movements by a plurality of actuators into a single 2-DOF movement.

[Description about National Research and Development Support]

This study was supported by the Global Frontier Project of Ministry of Science, ICT and Future Planning, Republic of Korea (Project No. 1711015376) under the superintendence of National Research Foundation of Korea.

2. Description of the Related Art

Recently, a high-torque operation system is being utilized as an essential element of various devices in various technologies and industrial fields. In particular, in special fields such as robotics, medical treatment and aerospace, the demand on such a high-torque operation system is increasing.

In an existing technique in relation to the high-torque operation system, in order to generate a high-torque output by using a rotating motor, an output shaft of the rotating motor should be coupled to an input shaft of a separate additional reduction gear. An input high-speed low-torque rotating movement is converted into a low-speed high-torque rotating movement as much as a gear ratio of the reduction gear and then output.

However, the existing technique has a problem in its complicated structure, since a reduction gear having a plurality of gears is used. In addition, since a reduction gear is additionally coupled to the rotating motor, an occupied volume increases.

In the above special fields, there is needed a structure for giving a high-torque output with a simple structure since more precise operations are demanded. In particular, in a field where operations are performed in a micro unit, there is an increasing demand on a simple structure capable of minimizing a volume occupied by the operation system.

SUMMARY

The present disclosure is directed to providing an apparatus for controlling a plurality of linear movements to be converted into a 2 degree-of-freedom (2-DOF) movement, in order to solve problems of an existing high-torque operation system as described above.

The object of the present disclosure is not limited to the above, and other objects not mentioned above will be clearly understood from the following disclosure by those skilled in the art.

In one aspect, there is provided a movement conversion apparatus, which includes: a frame; a plurality of auxiliary moving bodies connected to the frame to allow linear movement; a plurality of actuators configured to move the plurality of auxiliary moving bodies with respect to the frame; and a main moving body surrounded by the plurality of auxiliary moving bodies and connected to the plurality of auxiliary moving bodies to have a hollow formed therein, wherein the plurality of auxiliary moving bodies are selectively moved to adjust a location of the main moving body.

According to an embodiment of the present disclosure, the auxiliary moving bodies may be connected to the frame by means of auxiliary supports, and the auxiliary supports may be made of elastic material to give an elastic force for restoring the auxiliary moving bodies to original locations when the auxiliary moving bodies make a location movement.

According to an embodiment of the present disclosure, the main moving body may be connected to the auxiliary moving bodies by means of main supports, and the main supports may be made of elastic material to give an elastic force for restoring the main moving body to an original location when the main moving body makes a location movement.

According to an embodiment of the present disclosure, the auxiliary supports may be leaf springs extending in a direction perpendicular to a moving direction of the auxiliary moving bodies, and the main supports may be leaf springs extending in a direction perpendicular to the auxiliary supports.

According to an embodiment of the present disclosure, the auxiliary support and the main support of one of the auxiliary moving bodies may form a closed loop together with an auxiliary support and a main support of an auxiliary moving body adjacent thereto.

According to an embodiment of the present disclosure, each two of the plurality of auxiliary moving bodies may make a pair, and the two auxiliary moving bodies making a pair may be disposed to face each other based on the main moving body and move in the same direction.

According to an embodiment of the present disclosure, one of the two auxiliary moving bodies making a pair may move by an actuator to cause a location movement of the main moving body, and the other of the two auxiliary moving bodies making a pair may make a location movement by the main moving body.

According to an embodiment of the present disclosure, the plurality of auxiliary moving bodies may be arranged along a circumferential direction of the main moving body, whereby the main moving body makes a two-dimensional plane movement.

According to an embodiment of the present disclosure, the main moving body may be controlled to make a curvilinear translation on the basis of a reference axis.

According to an embodiment of the present disclosure, before a first actuator terminates an operation for moving an auxiliary moving body connected thereto, a second actuator adjacent to the first actuator in a circumferential direction of the main moving body may start an operation for moving an auxiliary moving body connected thereto, so that the main moving body makes a curvilinear translation.

According to an embodiment of the present disclosure, one actuator may be connected to each of the plurality of auxiliary moving bodies, the actuator may be configured to move an auxiliary moving body connected thereto only in one direction, and a plurality of actuators arranged along a circumference of the main moving body may be operated in order, so that the main moving body makes a curvilinear translation.

According to an embodiment of the present disclosure, the actuator may include a wire made of a shape memory alloy, and the wire may draw the auxiliary moving body in one direction by means of shrinkage.

According to an embodiment of the present disclosure, the plurality of auxiliary moving bodies may include a first auxiliary moving body and a second auxiliary moving body disposed to face each other based on the main moving body; when a first wire connected to the first auxiliary moving body is shrunken by means of an applied current to draw the first auxiliary moving body, the main moving body may move in one direction; when the main moving body moves to draw the second auxiliary moving body, a second wire connected to the second auxiliary moving body may extend to store an elastic force; and when the current applied to the first wire is released, the second auxiliary moving body, the main moving body and the first auxiliary moving body may be drawn in a direction opposite to the one direction by means of the elastic force stored in the second wire so that the main moving body is restored to an original location.

According to an embodiment of the present disclosure, the main moving body may have a hollow formed therein, a rotating body rotatable on the basis of a rotary shaft fixed through the hollow may be disposed in the hollow, a diameter of the rotating body may be smaller than a diameter of the hollow, an inner surface of the hollow of the main moving body may be coupled to an outer surface of the rotating body by means of a gear mechanism, and when the main moving body makes a curvilinear translation, the rotating body may rotate based on the rotary shaft.

According to an embodiment of the present disclosure, the gear mechanism may be any one selected from the group consisting of an involute spur gear, a cycloid gear, a friction gear and a magnetic gear.

DETAILED DESCRIPTION

Hereinafter, an apparatus for converting a movement (hereinafter, also referred to as a movement conversion apparatus) according to an embodiment of the present disclosure will be described with reference to the accompanying drawings.

Figure 1:
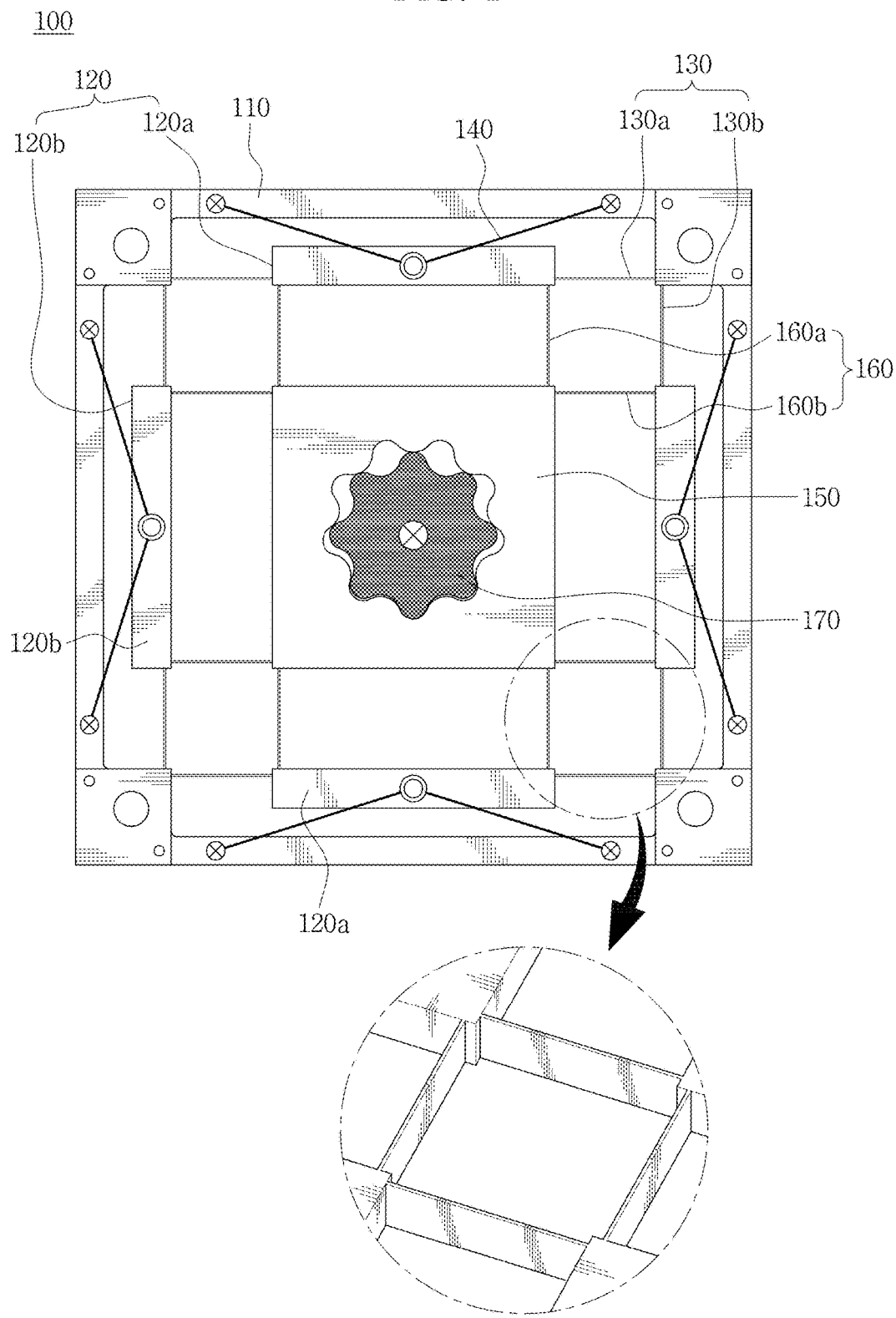
FIG. 1 is a schematically plane view showing an apparatus for converting a movement (hereinafter, also referred to as a movement conversion apparatus).

Referring to FIG. 1, a movement conversion apparatus 100 according to an embodiment of the present disclosure includes a frame 110, an auxiliary moving body 120, an auxiliary support 130, an actuator 140, a main moving body 150, a main support 160, and a rotating body 170.

The frame 110 forms an inner space where other elements are accommodated. Each component is directly or indirectly connected to the frame 110 and supported by the frame 110.

The frame 110 may be formed to have separated inner and outer portions as shown in FIG. 1, but the frame 110 may be partially opened so that its inner and outer portions are connected. The frame 110 may be integrally fabricated to enhance structural stability and firmness of the apparatus of the present disclosure.

In this embodiment, the frame 110 has a rectangular shape, but the frame 110 may also have various shapes depending on the number of the actuators 140 and their output direction. In addition, the size, wall thickness, material or the like of the frame 110 may be suitably selected depending on design conditions.

A plurality of auxiliary moving bodies 120 are dispersed near the inner wall of the frame 110. The auxiliary moving bodies 120 are arranged in an annular form to surround the inner space of the frame 110. Meanwhile, the main moving body 150, described later, is disposed at the center of the inner space of the frame 110 surrounded by the auxiliary moving body 120.

The plurality of auxiliary moving bodies 120 are connected to allow linear movement with respect to the frame 110. The auxiliary moving body 120 disposed at an upper or lower side may be connected to the frame 110 to allow a vertical movement. In addition, the auxiliary moving body 120 disposed at a left or right side may be connected to the frame 110 to allow a lateral movement.

The auxiliary moving body 120 may be connected to the frame 110 by means of the auxiliary support 130. The auxiliary support 130 may be connected to the auxiliary moving body 120 and the frame 110 in a direction perpendicular to a moving direction of the auxiliary moving body 120 connected thereto. In other words, the auxiliary support 130 may be disposed to extend in a direction perpendicular to a moving direction of the auxiliary moving body 120 connected to an end of the auxiliary support 130. In the depicted example, the auxiliary support 130 connected to the auxiliary moving body 120 disposed at an upper side is connected to the frame 110 in a lateral direction. Therefore, the upper auxiliary moving body 120 may not move in a lateral direction but may move only in a vertical direction.

The auxiliary support 130 is made of elastic material such as a leaf spring and may give an elastic force for restoring the auxiliary moving body 120 to an original location when the auxiliary moving body 120 makes a location movement.

Meanwhile, the auxiliary moving body 120 may be configured so that a first auxiliary moving body 120a moving in a first direction (for example, in a vertical direction in FIG. 1) and a second auxiliary moving body 120b moving in a second direction (for example, in a lateral direction in FIG. 1) make a pair. In other words, two auxiliary moving bodies 120a or 120b making a pair may be disposed to face each other based on the main moving body 150 and move in the same direction.

In addition, among the auxiliary supports 130, a first auxiliary support 130a connected to the first auxiliary moving body 120a is disposed in a lateral direction between the first auxiliary moving body 120a and the frame 110, and among the auxiliary support 130s, a second auxiliary support 130b connected to the second auxiliary moving body 120b is disposed in a vertical direction between the second auxiliary moving body 120b and the frame 110.

As described above, since the auxiliary moving bodies 120a, 120b making a pair and the auxiliary supports 130a, 130b connecting the auxiliary moving bodies 120a, 120b are disposed symmetrically on the basis of the center of the inner space of the frame 110, it is possible to promote structural stability and simplicity.

The auxiliary moving body 120 is connected to the actuator 140 and receives a force from the actuator 140. The actuator 140 fixed to the frame 110 applies a force to the auxiliary moving body 120 so that the auxiliary moving body 120 moves with respect to the frame 110. Since a moving direction of the auxiliary moving body 120 is limited to one direction, the auxiliary moving body 120 may make a linear movement by the force applied from the actuator 140.

Meanwhile, if a linear actuator 140 making a linear movement is disposed to have the same moving direction as the auxiliary moving body 120, the force may be more efficiently applied. A non-linear actuator may also be used to implement a linear movement, but a linear actuator is preferred for convenient operation and simple structure. The linear actuator 140 may employ a wire made of shape memory alloy as shown in the figures, or an electromagnetic actuator, a pneumatic actuator, a piezoelectric actuator or the like.

If a force is applied from the actuator 140, the auxiliary moving body 120 moves. The auxiliary moving body 120 which has moved from its initial location receives an elastic force toward an initial location by the auxiliary support 130. In other words, since the auxiliary moving body 120 moves from the initial location where no force is applied to another location, the auxiliary moving body 120 receives a force in a direction opposite to its moving direction from the auxiliary support 130 connected thereto. In addition, if the force applied from the actuator 140 is released, the auxiliary moving body 120 is restored to the initial location.

Meanwhile, one actuator 140 may be connected to each of the plurality of auxiliary moving bodies 120. At this time, each actuator 140 may be configured to move the auxiliary moving body 120 connected thereto only in one direction.

The main moving body 150 is disposed at the center of the inner space of the frame 110. The main moving body 150 is disposed to be surrounded by the plurality of auxiliary moving bodies 120 and connected to each of the plurality of auxiliary moving bodies 120. By doing so, a plane location of the main moving body 150 is determined according to movements of the plurality of auxiliary moving bodies 120. In other words, by selectively moving the plurality of auxiliary moving bodies 120, the main moving body 150 may be located at various locations. This will be described later in detail.

The main moving body 150 may be connected to the auxiliary moving body 120 by the main support 160. The main support 160 connects the auxiliary moving body 120 and the main moving body 150 in a direction parallel to a moving direction of the auxiliary moving body 120 connected thereto. In other words, when the main support 160 is connected to the auxiliary moving body 120 which is disposed at an upper side and moves in a vertical direction, the main support 160 extends in a vertical direction with respect to the main moving body 150. By doing so, if a vertical force is transferred to the auxiliary moving body 120, the main support 160 may transfer the force to the main moving body 150 without deformation.

The main support 160 is made of elastic material such as a leaf spring and may give an elastic force in a direction for restoring the main moving body 150 to an original location when the main moving body 150 makes a location movement.

Among the main support 160, a first main support 160a connected to the first auxiliary moving body 120a may be disposed in a vertical direction between the first auxiliary moving body 120a and the main moving body 150, and among the main support 160, a second main support 160b connected to the second auxiliary moving body 120b may be disposed in a lateral direction between the second auxiliary moving body 120b and the main moving body 150. In other words, a main support 160 and an auxiliary support 130 connected to a single auxiliary moving body 120 are disposed perpendicularly.

In addition, an auxiliary support 130 and a main support 160 connected to a single auxiliary moving body 120 may form a closed loop together with an auxiliary support 130 and a main support 160 connected to an auxiliary moving body 120 adjacent thereto. By doing so, while the auxiliary moving body 120 and the main moving body 150 move with respect to the frame 110, the force applied by the actuator 140 and the elastic force applied by the supports 130, 160 are regularly dispersed so that the main moving body 150 may move more stably.

Since the first auxiliary moving body 120a disposed at upper and lower sides of the main moving body 150 moves in a vertical direction, the main moving body 150 also moves in a vertical direction due to the first main support 160a. If the first auxiliary moving body 120a disposed at an upper side is moved by the upper actuator 140, a location movement is caused to the main moving body 150. In addition, as the main moving body 150 makes a location movement, the first auxiliary moving body 120a disposed at a lower side also makes a location movement. Meanwhile, if the main moving body 150 makes a location movement in a vertical direction, the first auxiliary support 130a and the second main support 160b are bent in a vertical direction.

In addition, as the second auxiliary moving body 120b disposed at right and left sides of the main moving body 150 moves in a lateral direction, the main moving body 150 also moves in a lateral direction due to the second main support 160b. At this time, the second auxiliary support 130b and the first main support 160a are bent in a lateral direction.

In other words, the main moving body 150 receives a force in its moving direction from a main support 160 connected between any moving auxiliary moving body 120 and the main moving body 150 and receives a force in an opposite direction from a main support 160 connected between the other auxiliary moving body 120 and the main moving body 150.

As described above, two auxiliary moving bodies 120 disposed to face each other based on the main moving body 150 and making a pair may move in the same direction. Since all elements are symmetrically arranged, force may be stably transferred among the elements.

Since the plurality of auxiliary moving bodies 120 are disposed along a circumferential direction of the main moving body 150 as described above, due to a linear movement of each auxiliary moving body 120, the main moving body 150 may move on a two-dimensional plane. In addition, the main moving body 150 may make a curvilinear translation based on a reference axis by controlling the plurality of auxiliary moving bodies 120 in order, as described later in detail.

Meanwhile, the auxiliary support 130 and the main support 160 may be made of two elastic bodies arranged in parallel as shown in FIG. 1. By doing so, a force applied in the connection direction may be transferred more securely, and when bending occurs due to a lateral force, torsion caused by the bending may be prevented. Meanwhile, the auxiliary support 130 and the main support 160 may also be configured with a single elastic body or a plurality of elastic bodies connected in parallel, depending on design conditions.

The rotating body 170 is disposed to be inserted into the hollow formed in the main moving body 150. An inner diameter of the main moving body 150 is greater than an outer diameter of the rotating body 170. Therefore, the rotating body 170 is inserted loosely into the hollow of the main moving body 150.

The rotating body 170 is provided through the hollow of the main moving body 150 and rotates around a rotary shaft which is fixed. The rotating body 170 may rotate around the rotary shaft due to the curvilinear translation of the main moving body 150, as described later in detail.

Figure 2A:
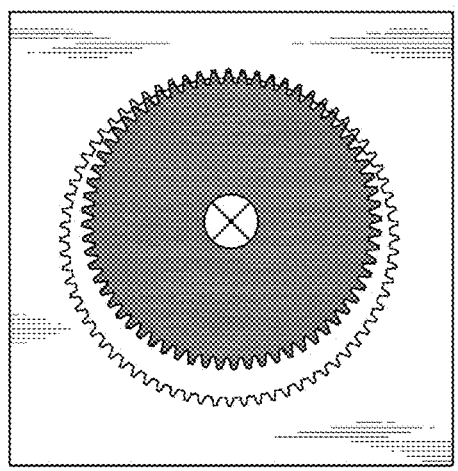
FIGS. 2A to 2C are schematically plane views showing modifications of the movement conversion apparatus of FIG. 1.
Figure 2B:
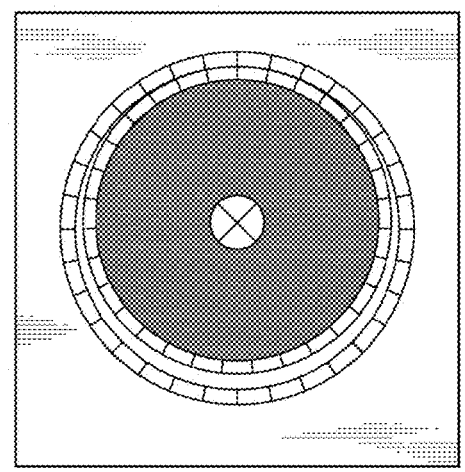
Figure 2C:
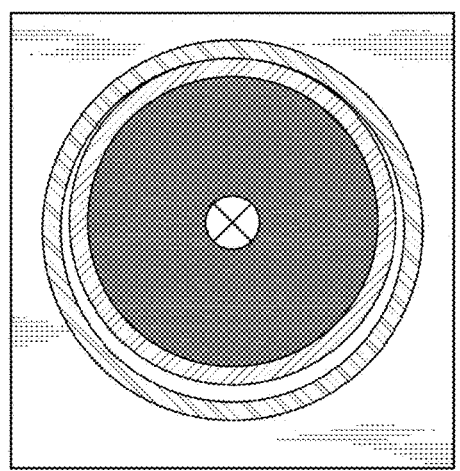

Meanwhile, the inner surface of the main moving body 150 and the outer surface of the rotating body 170 may be respectively coupled by a gear mechanism. The gear mechanism may employ a cycloid gear as shown in FIG. 1, an involute gear as shown in FIG. 2a, a magnetic gear where opposite polarities are disposed alternately as shown in FIG. 2b, or a friction gear as shown in FIG. 2c.

Hereinafter, operations of the movement conversion apparatus 100 configured as above according to an embodiment of the present disclosure will be described in detail.

Figure 3A:
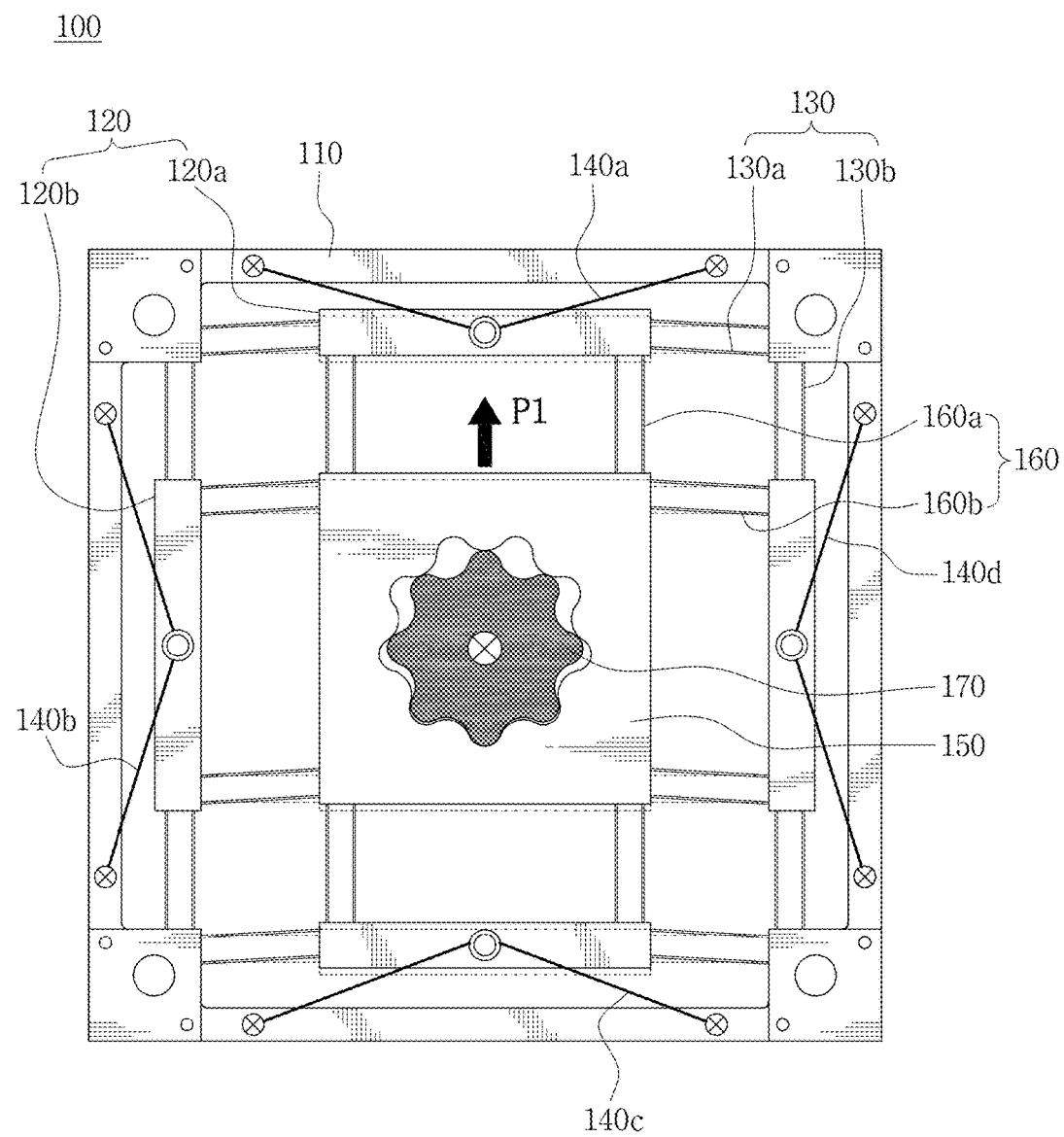
FIGS. 3A to 3D are schematically plane views for illustrating operations of the movement conversion apparatus of FIG. 1.
Figure 4:
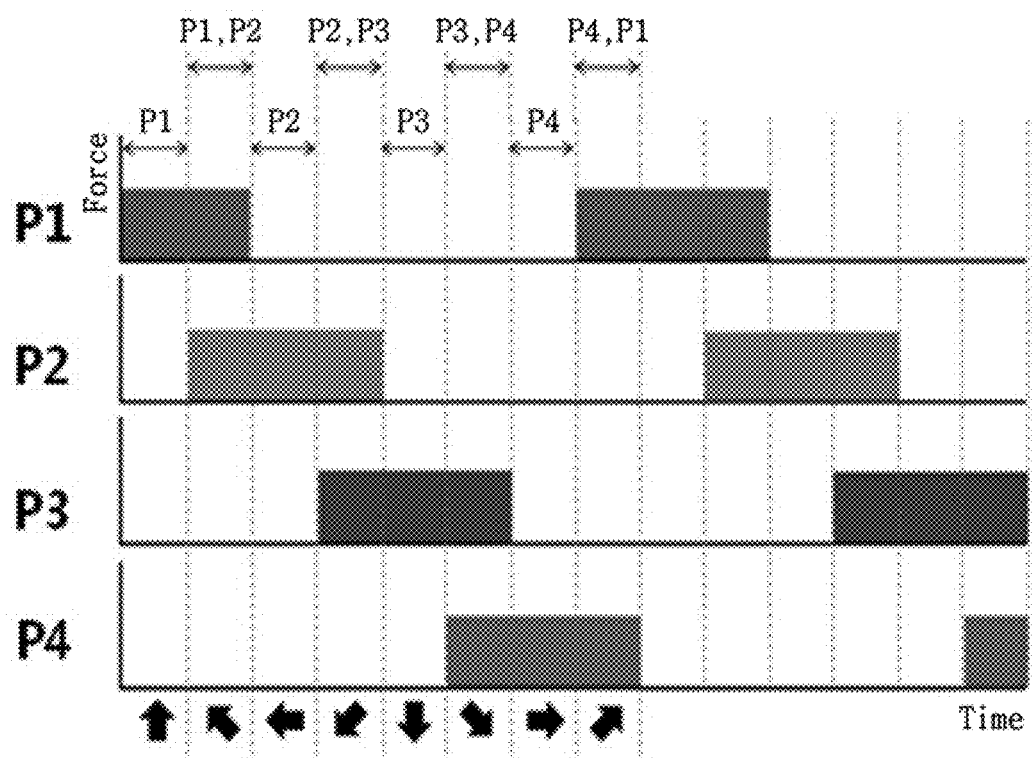
FIG. 4 is a graph showing an operation timing of the movement conversion apparatus depicted in FIGS. 3A to 3D.

Referring to FIG. 3a, first, a force P1 is applied upwards by an upper actuator 140a to move the first auxiliary moving body 120a upwards. At this time, as shown in FIG. 4, while the upper actuator 140a is operating, other actuators 140b, 140c, 140d do not operate. As the wire of the upper actuator 140a is shrunken due to a current applied thereto, the upper first auxiliary moving body 120a is drawn upwards, and the lower actuator 140c may store an elastic force as being stretched. Meanwhile, when another actuator such as an electromagnetic actuator is used, it should be noted that a force in the same direction by a lower actuator 140c may be applied in addition to the force by the upper actuator 140a.

At this time, the main moving body 150 also moves upwards by the first main support 160a. By doing so, external gear teeth at the lower portion of the rotating body 170 are engaged with internal gear teeth at a lower portion of the inner wall of the main moving body 150. Meanwhile, the first auxiliary support 130a and the second main support 160b are bent upwards to give a downward elastic force to the first auxiliary moving body 120a and the main moving body 150.

Figure 3B:
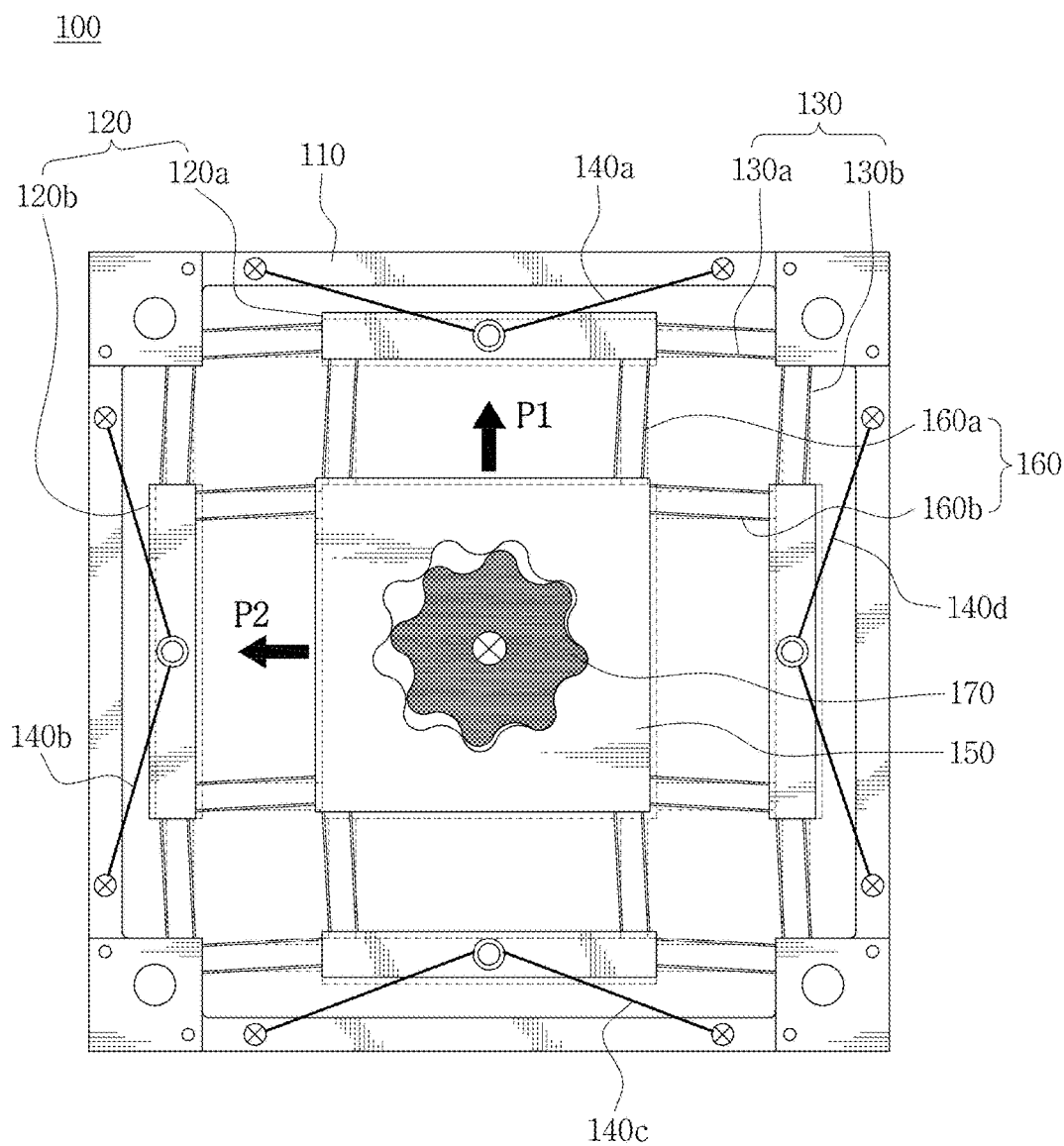

Next, referring to FIG. 3b, in a state where the force P1 is applied by the upper actuator 140a, a force P2 is simultaneously applied by a left actuator 140b in a left direction to move the second auxiliary moving body 120b in a left direction. At this time, as shown in FIG. 4, while the upper actuator 140a and the left actuator 140b are operating, the other actuators 140c, 140d do not operate. As the wire of the left actuator 140b is shrunken due to a current applied thereto to draw the left second auxiliary moving body 120b in a left direction, and the right actuator 140d may be stretched to the left and store an elastic force. Meanwhile, when another actuator such as an electromagnetic actuator is used, it should be noted that a force in the same direction by a right actuator 140d may be applied in addition to the force by the left actuator 140b.

At this time, the main moving body 150 also moves in a left direction by the second main support 160b. Therefore, the main moving body 150 moves to a left and upper position from an initial location where no force is applied. By doing so, right-lower external gear teeth of the rotating body 170 are engaged with right-lower internal gear teeth of the main moving body 150. The lower external gear teeth of the rotating body 170 which have been in an engagement state in FIG. 3a is pushed in a left direction as the main moving body 150 moves in a left direction, and thus the lower external gear teeth of the rotating body 170 are somewhat spaced apart from the lower external gear teeth of the main moving body 150. By doing so, the rotating body 170 rotates as much as a predetermined angle in a clockwise direction.

Meanwhile, the second auxiliary support 130b and the first main support 160a are bent to give an elastic force to the second auxiliary moving body 120b and the main moving body 150 in a right direction. The first auxiliary support 130a and the second main support 160b in an upwardly bent state give an elastic force to the first auxiliary moving body 120a and the main moving body 150 in a lower direction.

Figure 3C:
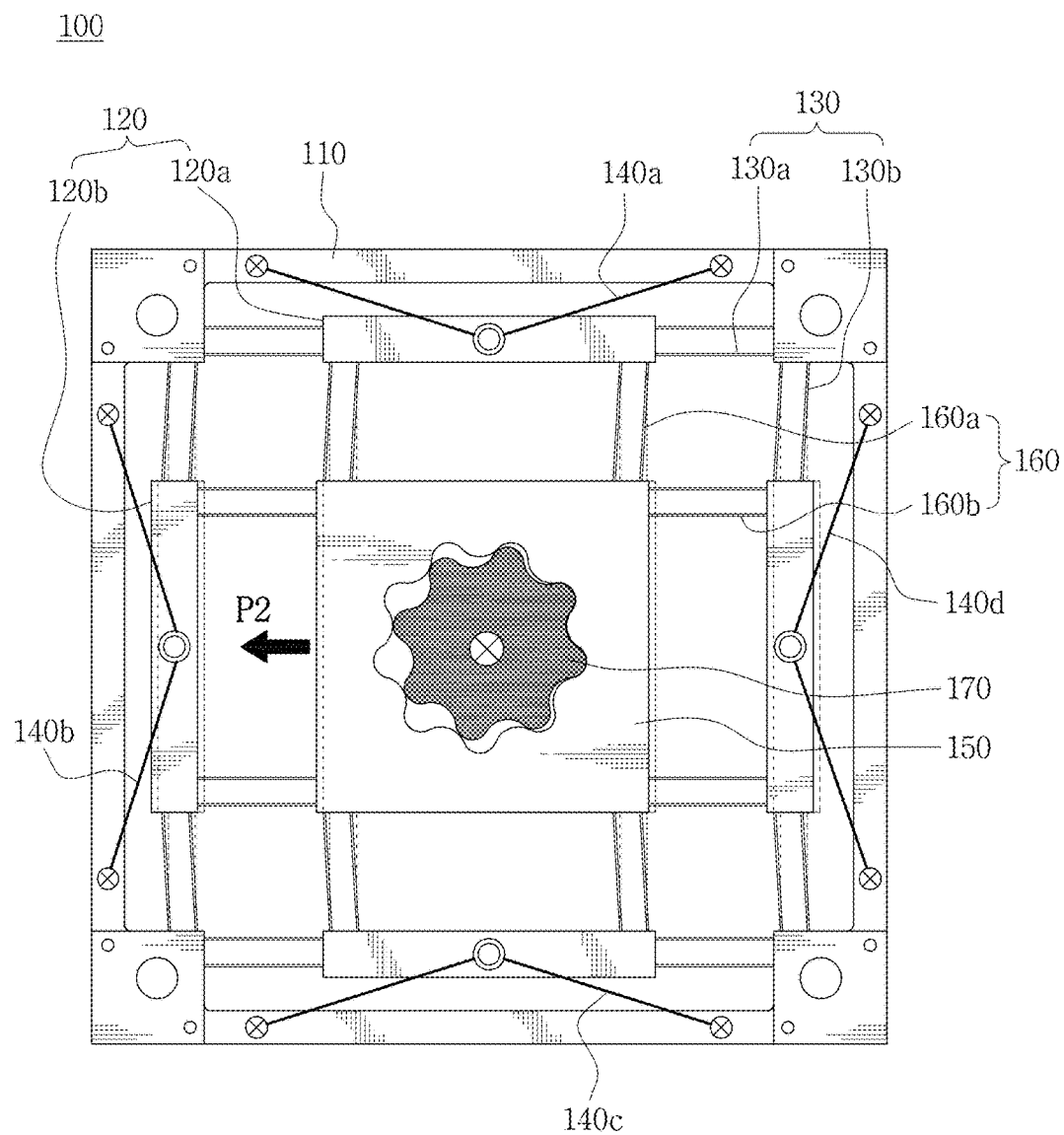

Next, referring to FIG. 3c, as the force P1 by the upper actuator 140a is released, the first auxiliary moving body 120a moves in a lower direction. At this time, as shown in FIG. 4, while the left actuator 140b is operating, the other actuators 140a, 140c, 140d do not operate. If the current applied to the wire of the upper actuator 140a is released, the first auxiliary moving body 120a and the main moving body 150 are pulled in a lower direction due to the elastic force stored in the wire and restored to the initial location.

At this time, the main moving body 150 also moves in a lower direction by the first main support 160a. Therefore, the main moving body 150 is in a state of being moved in a left direction from the initial location. By doing so, the right external gear teeth of the rotating body 170 are engaged with the right internal gear teeth of the main moving body 150. The right-lower external gear teeth of the rotating body 170 which have been in an engagement state in FIG. 3b are pushed in a lower direction as the main moving body 150 moves in a lower direction, and thus the right-lower external gear teeth of the rotating body 170 are somewhat spaced apart from the right-lower internal gear teeth of the main moving body 150. By doing so, the rotating body 170 rotates again as much as a predetermined angle in a clockwise direction.

Meanwhile, the first auxiliary support 130a and the second main support 160b restore their original states, and an elastic force is not applied to the first auxiliary moving body 120a and the main moving body 150 any more. The second auxiliary support 130b and the first main support 160a in a bent state in a left direction apply an elastic force to the second auxiliary moving body 120 and the main moving body 150 in a right direction.

Figure 3D:
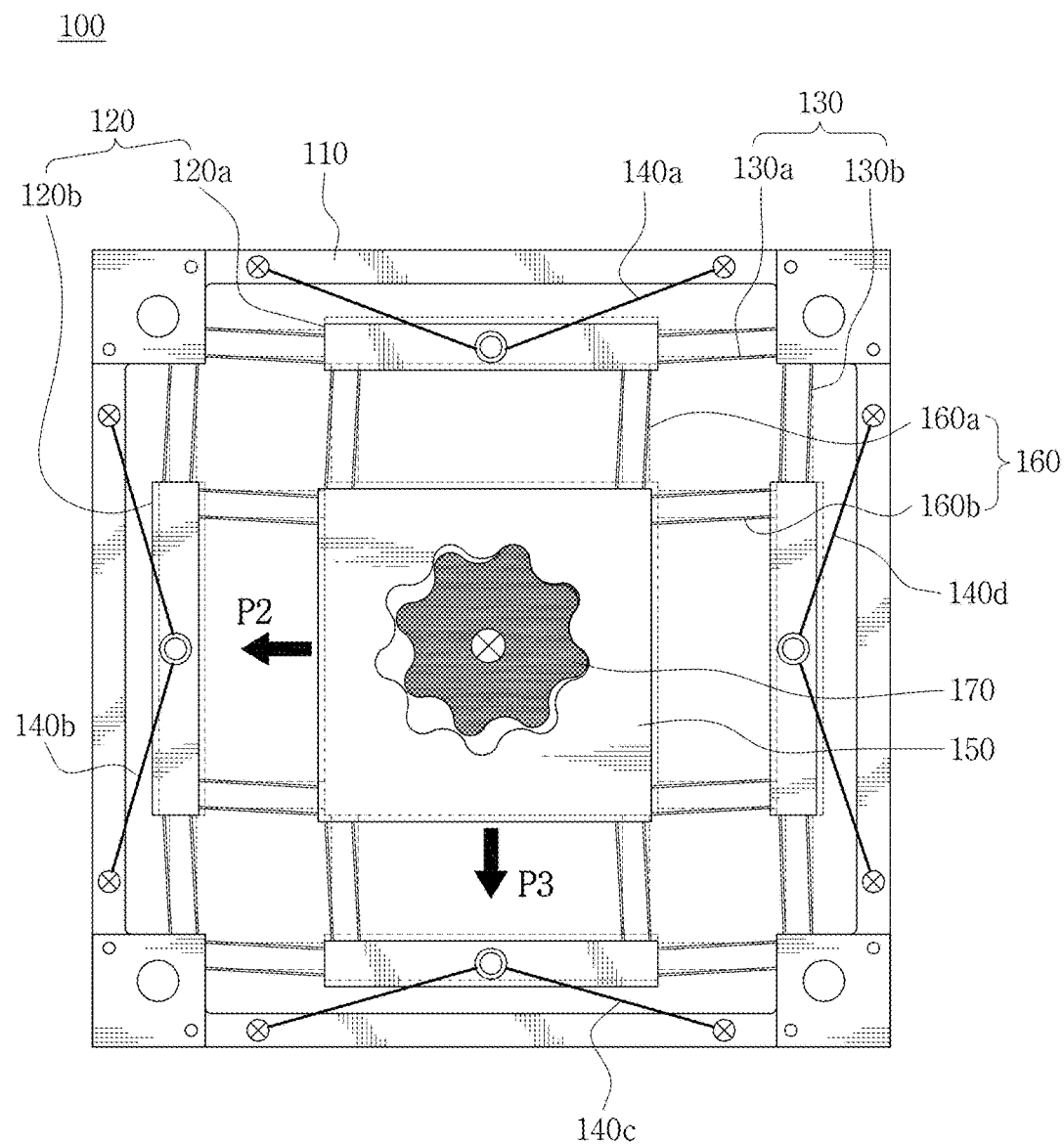

Next, referring to FIG. 3d, in a state where the force is applied by the left actuator 140b, a force P3 is simultaneously applied in a lower direction by the lower actuator 140c so that the first auxiliary moving body 120a moves in a lower direction. At this time, as shown in FIG. 4, while the left actuator 140b and the lower actuator 140c are operating, the other actuators 140a, 140d do not operate. The wire of the lower actuator 140c is shrunken by a current applied thereto to draw the lower first auxiliary moving body 120a in a lower direction.

At this time, the main moving body 150 also moves in a lower direction by the first main support 160a. Therefore, from the initial location where no force is applied, the main moving body 150 moves to a left lower side. By doing so, right upper external gear teeth of the rotating body 170 are engaged with right upper internal gear teeth of the main moving body 150. The right external gear teeth of the rotating body 170 which have been in an engagement state in FIG. 3c are pushed in a lower direction as the main moving body 150 moves in a lower direction, and thus the right external gear teeth of the rotating body 170 are somewhat spaced apart from the right internal gear teeth of the main moving body 150. By doing so, the rotating body 170 rotates again as much as a predetermined angle in a clockwise direction.

Meanwhile, the first auxiliary support 130a and the second main support 160b are bent in a lower direction to give an elastic force to the first auxiliary moving body 120a and the main moving body 150 in an upper direction. The second auxiliary support 130b and the first main support 160a bent in a left state still apply an elastic force to the second auxiliary moving body 120b and the main moving body 150 in a right direction.

As described above, if a force is applied to the actuators 140a, 140b, 140c, 140d in a counterclockwise direction or the force is released, the first auxiliary moving body 120a and the second auxiliary moving body 120b are selectively moved, so that the main moving body 150 may make a curvilinear translation which makes a linear movement while drawing a circle.

Figure 5:
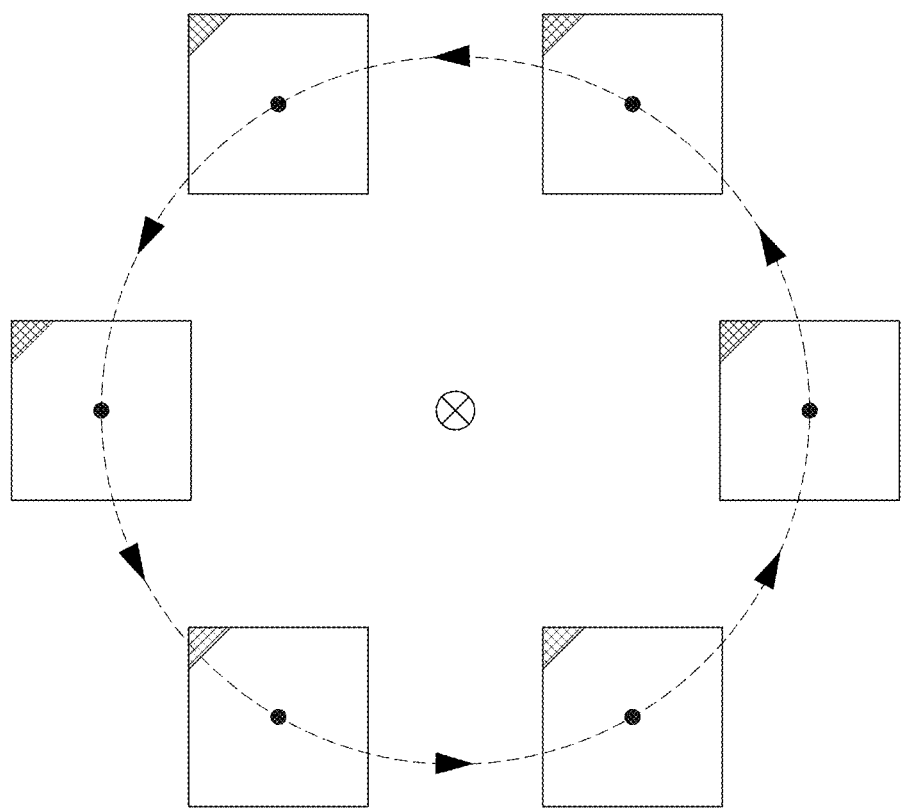
FIG. 5 is a diagram for illustrating curvilinear translation of the movement conversion apparatus of FIG. 1.

Referring to FIG. 5, the main moving body 150 changes its location to make a curved movement or a rotating movement around the rotary shaft, but the main moving body 150 does not rotate by itself. In other words, even though the main moving body 150 makes a location movement while drawing a curved or circular trajectory around the rotary shaft, a direction in which the main moving body 150 is disposed is maintained constantly. As described above, as the main moving body 150 makes a curvilinear translation, the rotating body 170 inserted therein may rotate.

Meanwhile, as the main moving body 150 makes a curvilinear translation in a counterclockwise direction, the rotating body 170 rotates in a clockwise direction. Also, as the main moving body 150 makes a curvilinear translation in a clockwise direction, the rotating body 170 rotates in a counterclockwise direction.

As shown in FIG. 4 showing an example of a method for operating the actuators 140a, 140b, 140c, 140d, before the first actuators 140a, 140c connected to the first auxiliary moving body 120a terminate an operation for moving the first auxiliary moving body 120a, the second actuators 140b, 140d adjacent to the first actuators 140a, 140c in a circumferential direction start an operation for moving the second auxiliary moving body 120b connected thereto, so that the main moving body 170 makes a curvilinear translation. The main moving body 150 may make a curvilinear translation by not only operating the first actuators 140a, 140c or the second actuators 140b, 140d in the same direction but also operating the plurality of actuators 140a, 140b, 140c, 140d arranged along a circumference of the main moving body 150 in order in a circumferential direction or an opposite direction.

If the actuators 140a, 140b, 140c, 140d are operated in a reverse order, the rotating body 170 may be rotated in an opposite direction. In addition, operation time of the actuators 140a, 140b, 140c, 140d may be shortened to increase a rotating speed of the rotating body 170 so that the main moving body 150 may draw a circular trajectory at a high speed.

Meanwhile, a gear ratio between the internal gear teeth of the main moving body 150 and the external gear teeth of the rotating body 170 may be adjusted, which may change a torque and a rotation speed of the rotating body 170. At this time, the gear ratio may be adjusted by exchanging a plurality of rotating bodies 170 having different number of external gear teeth.

As described above, if the movement conversion apparatus 100 according to an embodiment of the present disclosure is used, the main moving body 150 may make a curvilinear translation by using the first auxiliary moving body 120a and the second auxiliary moving body 120b which move in directions perpendicular to each other, and thus the rotating body 170 may rotate.

As described above, according to the present disclosure, it is possible to rotate the rotating body 170 by means of a curvilinear translation of the main moving body 150 with a simple structure and principle without any special guide member for the curvilinear translation. Therefore, the present disclosure may be used for various fields such as space science, medical fields or the like. In particular, since the volume occupied by an operating device is minimized, the apparatus of the present disclosure may be easily utilized in a small device.

Meanwhile, it should be noted that the movement conversion apparatus 100 according to an embodiment of the present disclosure may be modified as a movement conversion apparatus excluding the rotating body 170. This movement conversion apparatus converts a linear movement of each actuator into a simple plane movement, thereby ensuring accurate control when moving a target on a plane.

For reference, the actuators 140a, 140b, 140c, 140d, the first auxiliary moving body 120a and the second auxiliary moving body 120b, the first auxiliary support 130a and the second auxiliary support 130b, and the first main support 160a and the second main support 160b have been named in consideration of locations or moving directions for convenient explanation, but they are not limited thereto.

The movement conversion apparatus 100 according to an embodiment of the present disclosure has been described as an operating device which may guide a rotating movement of the rotating body 170 by converting linear movements of a plurality of auxiliary moving bodies 120 into a curvilinear translation of the main moving body 150, among various embodiments. However, the movement conversion apparatus according to the present disclosure is not limited thereto but may be implemented in various ways as a movement conversion apparatus which may obtain a 2-DOF movement of the main moving body 150 from linear movements of the plurality of auxiliary moving bodies 120.

While the exemplary embodiments have been shown and described, it will be understood by those skilled in the art that the present disclosure is not limited thereto, but various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

REFERENCE SYMBOLS

110: frame
120, 120a, 120b: auxiliary moving body
130, 130a, 130b: auxiliary support
140, 140a, 140b, 140c, 140d: actuator
150: main moving body
160, 160a, 160b: main support
170: rotating body
100: movement conversion apparatus

What is claimed is:

1. A movement conversion apparatus, comprising:
a frame;
a main moving body including a hollow;
a rotating body disposed in the hollow;
auxiliary moving bodies connected to the frame by elastic auxiliary supports to enable a planar movement of the main moving body with respect to the frame; and
actuators configured to selectively move the auxiliary moving bodies with respect to the frame to adjust a location of the main moving body,
wherein the main moving body is connected to and surrounded by the auxiliary moving bodies.

2. The movement conversion apparatus according to claim 1, wherein the auxiliary supports provide a biasing force for restoring the auxiliary moving bodies to original locations of the auxiliary moving bodies.

3. The movement conversion apparatus according to claim 2, wherein
the main moving body is connected to the auxiliary moving bodies by means of main supports, and
the main supports are made of an elastic material to provide a biasing force for restoring the main moving body to an original location of the main moving body.

4. The movement conversion apparatus according to claim 3, wherein
the auxiliary supports include first leaf springs extending in a direction perpendicular to a moving direction of the auxiliary moving bodies, and
the main supports include second leaf springs extending in a direction perpendicular to the auxiliary supports.

5. The movement conversion apparatus according to claim 4, wherein an auxiliary support, among the auxiliary supports, and a main support, among the main supports, form a closed loop with another auxiliary support, among the auxiliar supports, and another main support, among the main supports.

6. The movement conversion apparatus according to claim 1, wherein opposite auxiliary moving bodies, among the auxiliary moving bodies, face each other and configured to move in a same direction.

7. The movement conversion apparatus according to claim 1, wherein an actuator, among the actuators, is configured to move one of the auxiliary moving bodies to cause a movement of the main moving body and a movement of another of the auxiliary moving bodies opposite to the one of the auxiliary moving bodies.

8. The movement conversion apparatus according to claim 1, wherein the auxiliary moving bodies are arranged around a perimeter of the main moving body.

9. The movement conversion apparatus according to claim 8, wherein the main moving body is configured to be controlled to make a curvilinear translation about a reference axis.

10. The movement conversion apparatus according to claim 9, wherein before a first actuator, among the actuators, terminates an operation for moving a first auxiliary moving body, among the auxiliary moving bodies, connected to the first actuator, a second actuator, among the actuators, adjacent to the first actuator, starts an operation for moving a second auxiliary moving body, among the auxiliary moving bodies, connected to the second actuator, so that the main moving body curvilinearly translates.

11. The movement conversion apparatus according to claim 9, wherein
the actuators are respectively connected to the auxiliary moving bodies,
each of the actuators is configured to unidirectionally move an auxiliary moving body, among the auxiliarly moving bodies, and
the actuators are arranged along a perimeter of the main moving body, and are sequentially operated so that the main moving body curvilinearly translates.

12. The movement conversion apparatus according to claim 11, wherein
the actuators include a wire made of a shape memory alloy, and
the wire is configured to pull the auxiliary moving body by shrinkage of the wire.

13. The movement conversion apparatus according to claim 11, wherein
the auxiliary moving bodies include a first auxiliary moving body and a second auxiliary moving body facing the first auxiliary moving body,
when a first wire connected to the first auxiliary moving body shrinks in response to an applied current, the main moving body moves in a first direction,
when the main moving body moves in the first direction, the second auxiliary moving body is pulled, and a second wire connected to the second auxiliary moving body is strained to store potential energy, and
when the applied current is discontinued, the second auxiliary moving body, the main moving body, and the first auxiliary moving body are pulled in a second direction opposite to the first direction by a release of the potential energy so that the main moving body is restored to an original location.

14. The movement conversion apparatus according to claim 9, wherein
the rotating body is rotatable about a rotary shaft fixed through the hollow,
a diameter of the rotating body is smaller than a diameter of the hollow,
an inner surface of the hollow of the main moving body is coupled to an outer surface of the rotating body by means of a gear mechanism, and
when the main moving body curvilinearly translates, the rotating body rotates about the rotary shaft.

15. The movement conversion apparatus according to claim 14, wherein the gear mechanism is any one selected from the group consisting of an involute spur gear, a cycloid gear, a friction gear, and a magnetic gear.

* * * * *